(12) United States Patent
Deppen

(10) Patent No.: US 6,888,940 B1
(45) Date of Patent: May 3, 2005

(54) MAGNETIC HOLDER FOR CELL PHONES AND THE LIKE

(76) Inventor: Daniel Deppen, 7220 Owensmouth Ave., Suite 222, Canoga Park, CA (US) 91303

( * ) Notice: Subject to any disclaimer, the term of this patent is extended or adjusted under 35 U.S.C. 154(b) by 0 days.

(21) Appl. No.: 09/547,961

(22) Filed: Apr. 12, 2000

(51) Int. Cl.[7] ............................................. H04M 1/00
(52) U.S. Cl. ........................................ 379/446; 379/454
(58) Field of Search ................................ 379/446, 454, 379/455; 248/206.5, 309.4

(56) References Cited

U.S. PATENT DOCUMENTS

| | | |
|---|---|---|
| 5,992,807 A | 11/1999 | Tarulli |
| 6,149,116 A | 11/2000 | Won |

*Primary Examiner*—Jack Chiang
(74) *Attorney, Agent, or Firm*—Roy A. Ekstrand

(57) ABSTRACT

A magnetic holder for cell phones includes a cup formed of a ferromagnetic material or the like within which a magnet is supported. The rear surface of the cup includes a double-sided adhesive pad to provide attachment of the cup to a vehicle dashboard surface or the like. The cup concentrates the force of the magnet along the frontal edges thereof. A friction ring encircles the frontal edges of the cup to provide enhanced retention of a cell phone secured to the cup by magnetic attraction between the internal magnet and the cell phone battery or other metallic portion thereof. Alternate embodiments are shown which provide different shapes of cup and magnet and which provide differing attachments such as suction cups or belt clips for retaining the magnetic holder. In a further alternate embodiment, the packaging provided for the cup holder is constructed to facilitate the multiple display of the a plurality of cup holders and packages in typical point of sale environment.

17 Claims, 5 Drawing Sheets

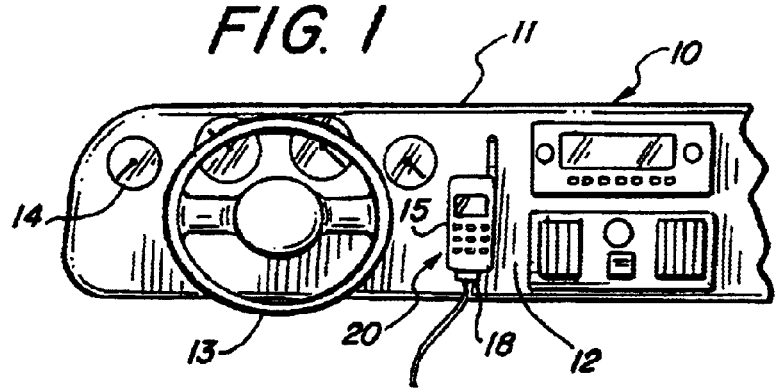
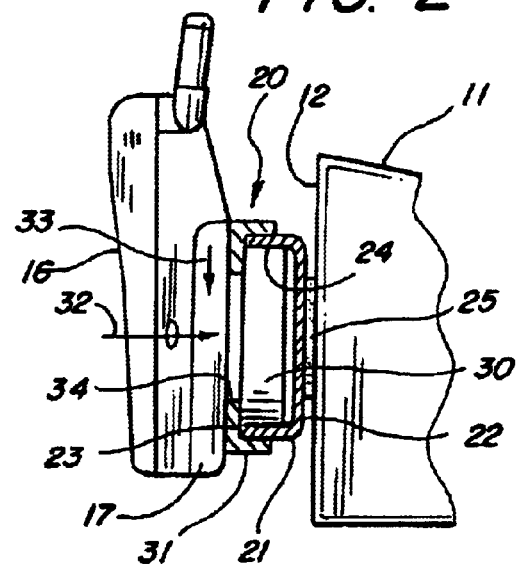
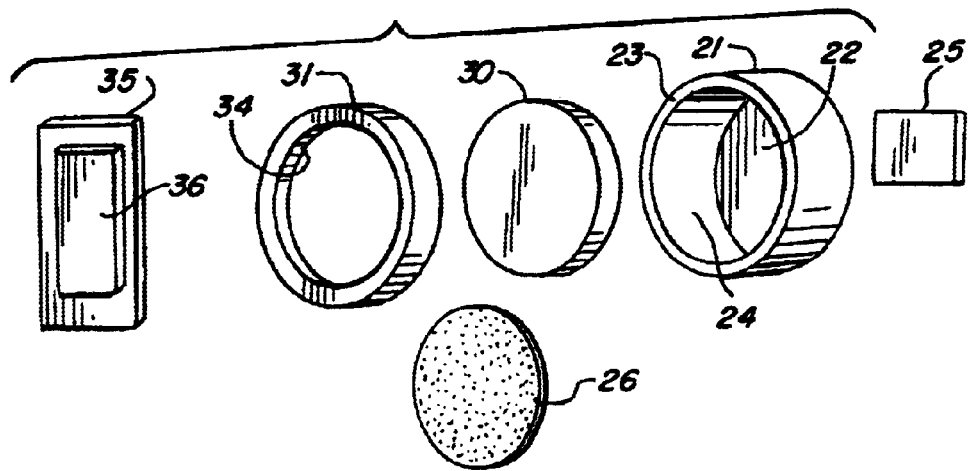

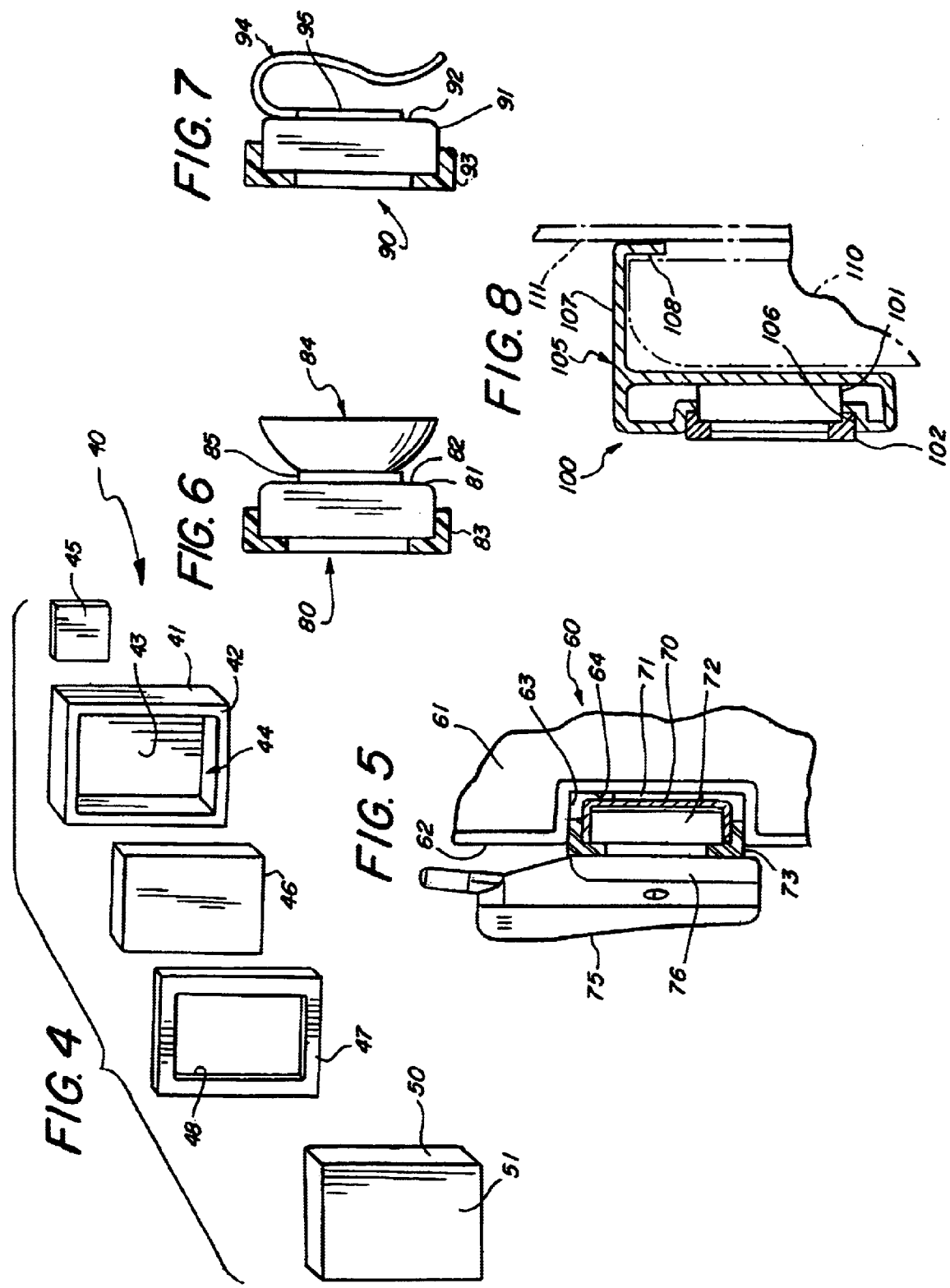

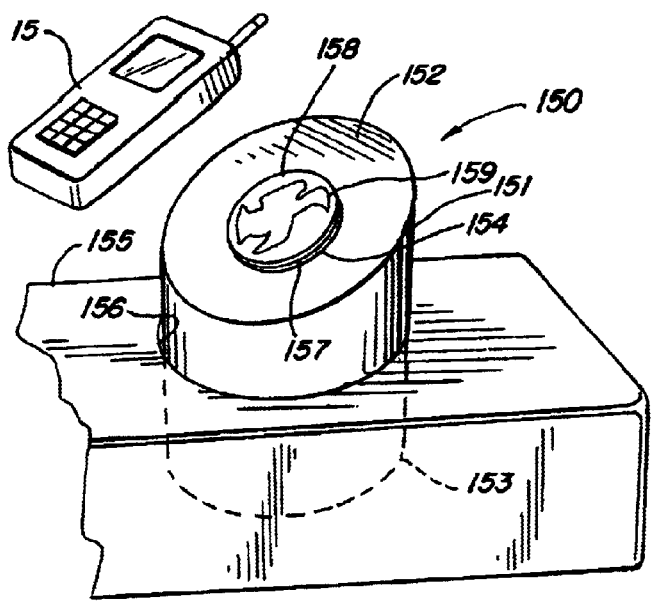
FIG. 11
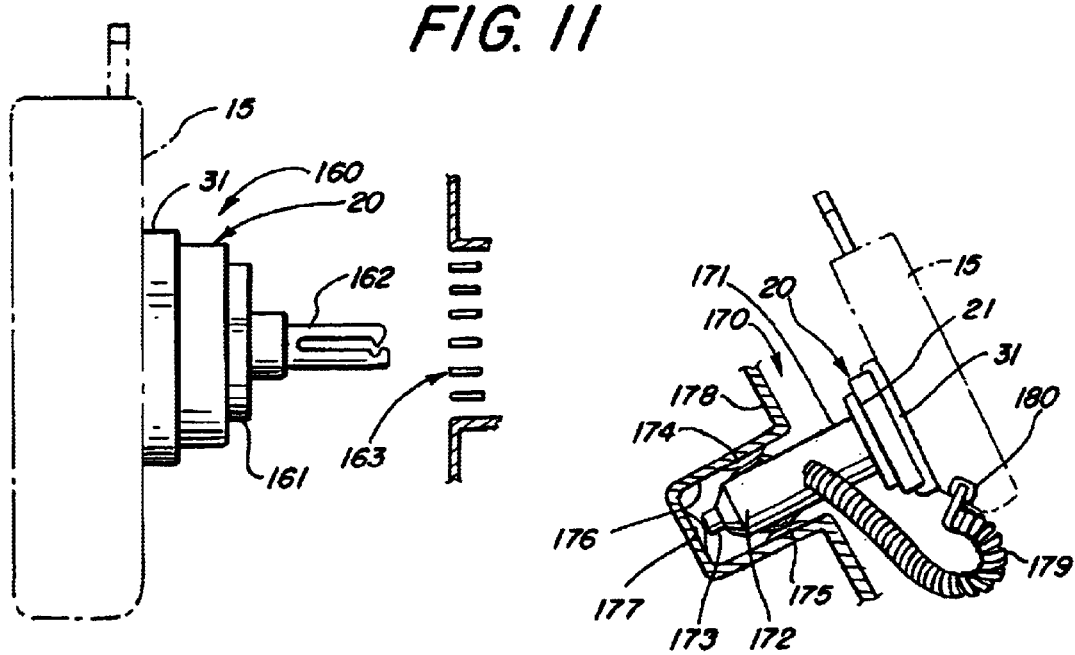
FIG. 12
FIG. 13

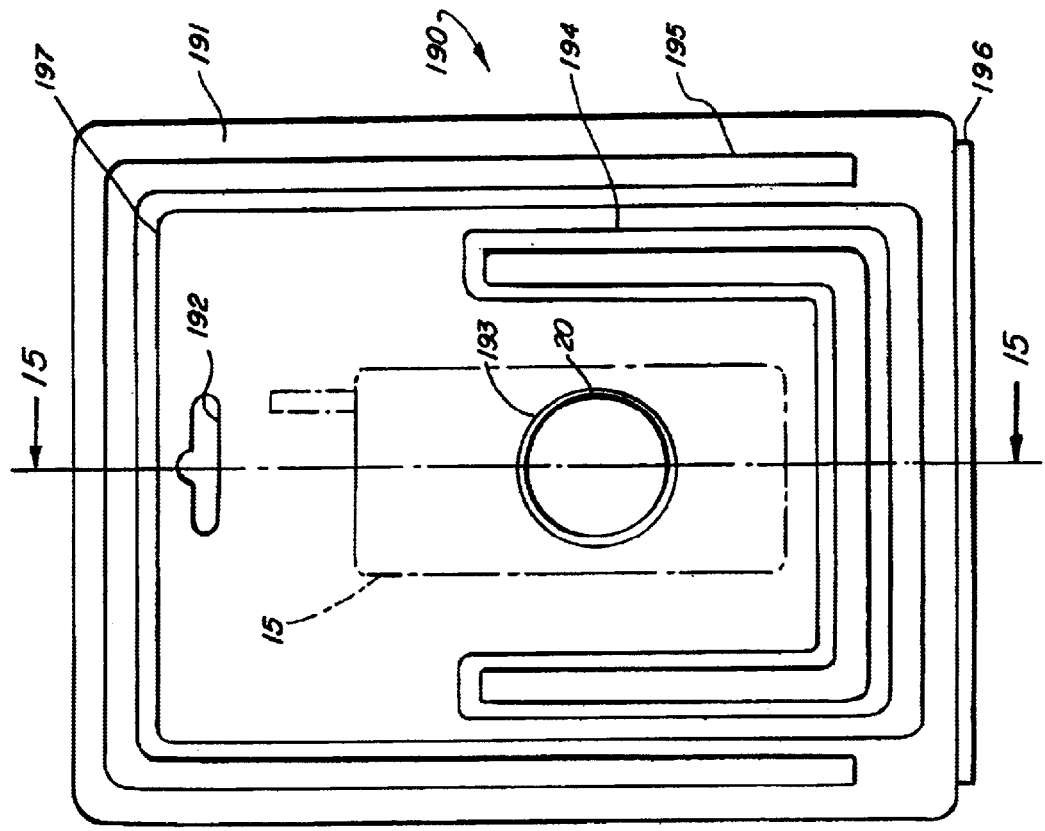
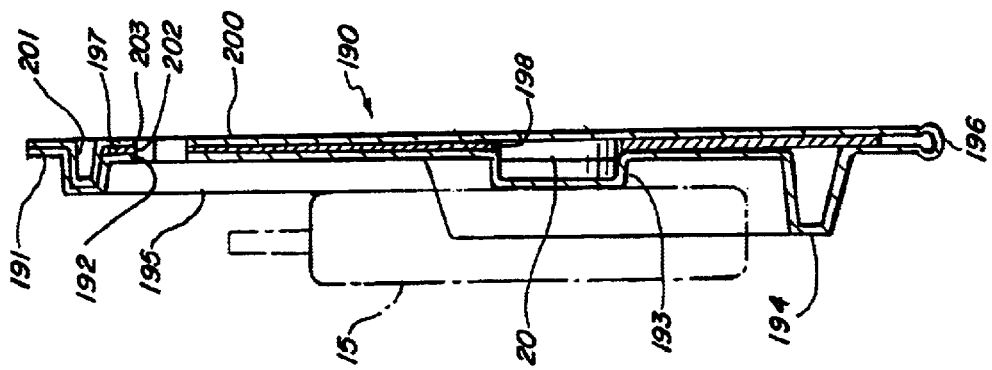

MAGNETIC HOLDER FOR CELL PHONES AND THE LIKE

FIELD OF THE INVENTION

This invention relates generally to cell phones and particularly to holding devices operative for securing or holding such articles.

BACKGROUND OF THE INVENTION

The explosive growth in the number and use of cell phones have been fueled in large part by the earlier development of phone systems in primarily for use in vehicles, automobiles, trucks, recreational vehicle or other types of conveniences. Originally, cell phones were referred to as "mobile phones or car phones" due to their primary use within vehicles. The substantial power consumption of early mobile or car phones and the resulting bulky size of such phones made fabrication of handheld or portable cell phones difficult and impractical. Thus, most early mobile or early car phones developed as dedicated units permanently installed within vehicles. Over time however, advances in technology associated with mobile phones, particularly in advances in digital electronic technology, led to increased development of so-called portable cell phones, the further and continuing advances in technology made practical the fabrication of portable cell phones which were relatively small handheld units suitable for carrying upon the user's person or other convenient methods of carrying such as brief cases, purses etc. A major portion of the development of practical handheld cell phones resulted from the reduction of power required for communication throughout the cell phone network which enjoyed substantial development during this same period. A corresponding improvement in battery technology accompanied this technological advance all of which came together to provide practical or handheld or personal cell phones.

As the development of cell phone technologies continued, the majority of dedicated installed units within vehicles of the type originally described as mobile phones or car phones began to be replaced in the market place by personal handheld units. While the design and fabrication of such personal handheld cell phones varies between manufactures, generally all include a housing, usually formed of a molded plastic material or the like, within which a digitally electronic circuit and associated components is supported. An antenna is further supported upon the housing together with a front face which supports a plurality of input buttons for user operation and a small display. Power is provided by rechargeable batteries which may for example include nickel cadmium, nickel metal hydride or lithium ion types of power sources.

In most compact personal type cell phones, the battery or battery pack is fitted to and forms a part of the cell phone housing. In most units the battery is supported at the rear of the cell phone housing to maximize the available front surface to be used for controls and display. The battery or battery pack is secured to the housing by a snap-latch mechanism which is sufficiently reliable and secure to support the weight of the entire cell phone. In some manufacture devices, the battery pack includes an integral clip or holding attachment suitable for securing to the user's belt or purse or other convenient areas.

In some environments typical of cell phone use such as vehicle interiors, the use of a personal cell phone is subject to substantial inconvenience caused ironically by the compact size which renders such cell phones so popular and useful when carried about. Simply stated, it is often difficult to conveniently place or locate a handheld cell phone within a vehicle interior and is even more difficult to maintain the cell phone conveniently accessible within such vehicle interiors.

Faced with this limitation and inconvenience in the use of small personal cell phones, practitioner's in the art have provided a variety of retainers or holding devices which attempt to maintain such cell phones in convenient locations within a vehicle or the like. For example, U.S. Pat. No. 5,040,712 issued to Pesonen et al sets forth a MOUNTING SYSTEM FOR CAR TELEPHONE having amounting shoe provided with flutes and a partly grooved central portion. The mounting shoe further includes a mounting piece having flanges fitting into the flutes and a plate spring for engaging the grooved central portion to secure the coupling of the mounting shoe and the mounting piece.

U.S. Pat. No. Des. 411,216 issued to Richter sets forth a MAGNETIC TELEPHONE HOLDER having a generally rectangular housing defining a front face which in turn supports a pattered surface area.

U.S. Pat. No. Des. 406,592 issued to Richter sets forth a MAGNETIC TELEPHONE HOLDER having a generally rectangular planar housing defining a magnetic surface on one portion thereof. A raised supporting wall extends about a portion of the magnetic surface.

U.S. Pat. No. 5,555,302 issued to Wang sets forth a MOBILE TELEPHONE HOLDER having a base plate covered with a back cover, two clamping plates coupled to the base plate at opposite sides thereof and defining a rack, a rotating gear mounted inside the base plate and meshed between the racks, and locating gear and a sliding switch.

U.S. Pat. No. 5,745,565 issued to Wakefield sets forth a COMBINATION CUP AND CELLULAR PHONE HOLDER constructed to be received within an existing vehicle beverage holder. The combination cup and cellular phone holder includes recesses for receiving a beverage cup together with a recess for receiving a cell phone.

U.S. Pat. No. 5,568,549 issued to Wang sets forth a MOBILE TELEPHONE HOLDER having a mounting plate supported by a pair of suction cups against the interior windshield of the vehicle. A flexible arm extends downwardly and rearwardly from the base and supports a phone receptacle.

U.S. Pat. No. 5,836,563 issued to Ilsin-yung sets forth a MOBILE PHONE HOLDER having a base supporting a pair of movable jaws. A gear mechanism is operatively coupled to movable button which manipulates the jaws to grasp a cell phone therebetween.

U.S. Pat. No. Des. 365,567 issued to Cantrell sets forth a HOLDER FOR FLIP TYPE CELLULAR TELEPHONE having a base defining a receptacle configured to receive a cellular telephone. The base further includes and extending clip configured to grip the interior door edge of a vehicle or the like.

U.S. Pat. No. 5,619,395 issued to McBride sets forth a DEVICE FOR ATTACHING A WIRELESS TELEPHONE TO A PORTABLE COMPUTER having a bracket configured to receive a wireless telephone. The bracket is securable to the vertical lid or screen portion of a portable computer.

U.S. Pat. No. Des. 407,408 issued to Hoff sets forth a PHONE HOLDER having a generally cylindrical base supporting a planar element positioned at an acute angle to the cylindrical base. The planar element includes a plurality of upwardly extending tabs which cooperate to form a receptacle area for a phone.

U.S. Pat. No. Des. 411,544 issued to Richter sets forth a CLAMP WITH NECK AND TELEPHONE HOLDER WITH SIDEWALL having a clamping base supporting a flexible arm which in turn supports a housing having a telephone receptacle formed therein. A similar device is shown in U.S. Pat. No. Des. 411,217 also issued in the name of Richter.

U.S. Pat. No. Des. 411,209 issued to Richter sets forth a FLAT TELEPHONE HOLDER WITH CURVED ADHESIVE MOUNT having a generally rectangular housing defining a generally planar front face. The housing is secured to and supported by a flexible adhesive mounting member.

While the foregoing described prior art devices have generally improved the art and is some instances enjoyed commercial success, they are often unduly complex and costly. In addition the above described prior art devices often proved to be inconvenient for use within the limited space available in a typical vehicle interior. Accordingly, there remains a continuing need in the art for a simple, low-cost, effective and convenient apparatus for retaining and temporarily holding a cell phone or other similar article.

SUMMARY OF THE INVENTION

Accordingly, it is a general object of the present invention to provide an improved apparatus for retaining and holding a cell phone or the like. It is a more particular object of the present invention to provide an improved apparatus for holding and retaining a cell phone or other similar item within the confines of a vehicle interior or other environments which utilizes magnetic attachment.

In accordance with the present invention there is provided a magnetic cell phone holder constructed for use in combination with a cell phone, the magnetic cell phone holder comprising: a cup formed of a metal material and having a rear surface, an interior cavity and an open edge; a magnet received within the interior cavity; a friction element received upon the open edge and supported by the cup; and attachment means joined to the cup for securing the cup upon a selected surface, the magnet, the cup and the friction element cooperating to hold a cell phone by a combination of magnetic attraction and friction.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIG. 1 sets forth a partial perspective view of a typical vehicle interior and the present invention magnetic holder securing an illustrative cell phone;

FIG. 2 sets forth a partially sectioned side elevation view of the present invention magnetic holder supporting a typical cell phone;

FIG. 3 sets forth a perspective assembly view of the present invention magnetic holder;

FIG. 4 sets forth a perspective assembly view of an alternate embodiment of the present invention magnetic holder;

FIG. 5 sets forth a partially sectioned side elevation view of a still further alternate embodiment of the present invention magnetic holder;

FIG. 6 sets forth a partially sectioned side elevation view of a still further alternate embodiment of the present invention magnetic holder;

FIG. 7 sets forth a partially sectioned side elevation view of a still further alternate embodiment of the present invention magnetic holder;

FIG. 8 sets forth a partially sectioned side elevation view of a still further alternate embodiment of the present invention magnetic holder;

FIG. 11 sets forth a perspective view of still further alternate embodiment of the present invention cell phone holder;

FIG. 12 sets forth a side elevation view of a still further alternate embodiment of the present invention cell phone holder;

FIG. 13 sets forth a side elevation view of a still further alternate embodiment of the present invention cell phone holder;

FIG. 14 sets forth an alternate embodiment of the point of purchasing packaging utilized in combination with the present invention magnet holder;

FIG. 15 sets forth a section view of package 190 taken along section lines 15—15 in FIG. 14;

DESCRIPTION OF THE PREFERRED EMBODIMENTS

Figure 9:
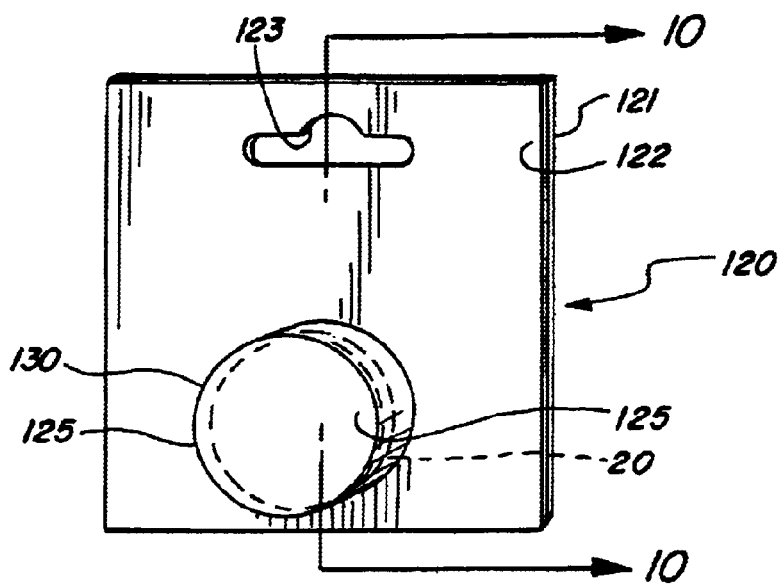
FIG. 9 sets forth a front perspective view of the present invention magnetic holder within a point of sale package therefore.

FIG. 1 sets forth a partial perspective view of a typical vehicle interior generally referenced by numeral 10. It will be understood that vehicle interior 10 is provided for purposed of illustration and that the present invention described below is capable of use in a variety of interiors including a variety of vehicle interiors. Thus, for purposes of illustration, vehicle interior 10 includes a vehicle dashboard 11 defining a surface 12. Surface 12 supports a plurality of instruments such as instrument 14 while dashboard 11 supports a conventional vehicle steering wheel 13. In accordance with the present invention, a magnetic cell phone holder generally referenced by numeral 20 is secured to surface 12 of dashboard 11 in the manner described below. Also in the manner described below, a typical cell phone 15 is retained upon and secured by magnetic holder 20. Suffice it to note here that cell phone 15 is removably supported upon magnetic holder 20 and surface 12 of dashboard 11 by magnetic attraction between holder 20 and the battery portion of cell phone 15 (not shown). In further accordance with the present invention and by means set forth below in greater detail, cell phone 15 is secured upon surface 12 of dashboard 11 in a manner which resists downward forces of gravity and which remains secure despite typical bumps and vibrations of the sort normally encountered in a vehicle.

In further accordance with the present invention, the user may leave cell phone 15 secured in the manner shown in FIG. 1 or alternatively may remove cell phone 15 from magnetic holder 20 by simply gripping cell phone 15 and drawing it away from magnetic holder 20 with sufficient force to overcome the magnetic restraining forces. Magnetic holder 20 remains secured to surface 12 of dashboard 11 and as a result, cell phone 15 may be simply returned to the secured position shown in FIG. 1 by placing cell phone 15 upon magnetic holder 20 and releasing the cell phone. Alternatively, cell phone 15 may be actuated in its retained position without removal from magnetic holder 20 in the event cell phone 15 is coupled to a conventional "hands-free" or "speaker phone" accessory. Such hands-free or speaker phone accessories are constructed entirely with conventional fabrication and are generally represented by accessory 18.

FIG. 2 sets forth a partially sectioned side elevation view of the present invention magnetic cell phone holder generally referenced by numeral 20. Cell phone holder 20 is shown in combination with a portion of dashboard 11. Cell phone holder 20 is further shown supporting a typical cell phone 16.

More specifically, magnetic cell phone holder 20 includes a metal cup 21 preferably formed of an iron or ferromagnetic steel material and defining a rear surface 22 and a front edge 23. Cup 21 further defines an interior 24 within which a magnet 30 is supported. Rear surface 22 of cup 21 is secured to surface 22 of cup 21 is secured to surface 12 of dashboard 11 by a two-sided adhesive pad 25. Pad 25 is fabricated in accordance with conventional fabrication techniques and is operative to secure cup 21 upon surface 12. Magnetic holder 20 further includes an annular ring 31 encircling edge 23 of cup 21 and defining an aperture 34. Annular ring 31 is preferably formed of a friction creating material such as rubber, plastic or the like.

A cell phone 16 constructed in accordance with conventional fabrication techniques includes a removable battery portion 17. Battery portion 17 is removably secured to the remainder of cell phone 16 in accordance with conventional fabrication (not shown). Suffice it to note here, that battery 17 latches or secures to cell phone 16 with sufficient strength to facilitate holding or retaining cell phone 16 by attachment to battery 17.

In accordance with the preferred fabrication of the present invention, cup 21 provides a suitable supporting enclosure for magnet 30 and further provides a directing or confining effect upon the magnetic flux produced by magnet 30 which concentrates the magnetic attraction of magnetic 30 upon the metal within battery 17 generally along edge 23. As a result, the magnetic force which retains or attracts battery 17 is substantially increased for any given strength for magnet 30. Magnet 30 may be provided by virtually permanent-type magnet. For example, magnet 30 may comprise a neodymium iron boron magnet or samarium cobalt magnet or alnico magnet or ferrite/ceramic magnet or other suitable magnets having sufficient strength the meet the needs of holder 20.

In further accordance with the preferred fabrication of the present invention, annular ring 31 being formed of a friction-type material such as rubber or plastic or the like is positioned to interposed between edge 23 of cup 21 and battery 17 of cell phone 16. The positioning of the friction creating material of annular ring 31 provides a suitable increase in the friction created between battery 17 and holder 20. Thus, as magnet 30 attracts battery 17 in the direction indicated by arrow 32, a corresponding friction is created between annular ring 31 and battery 17 whereby downwardly directed forces imparted to cell phone 16 in the manner indicated by arrow 33 due to bumps and vibrations encountered by the host vehicle are additionally resisted by the friction created between annular ring 31 and battery 17. It has been found that the use of a friction material between the front surface of holder 20 and the contacting surface of battery 17 greatly enhances the security of attachment provided by the present invention holder.

Once again, the user is able to withdrawal from cell phone 16 from holder 20 by simply gripping cell phone 16 and drawing it away from holder 20 with sufficient force to overcome the force of magnet 30. Conversely, the user is able to secure cell phone 16 by simply aligning battery 17 with holder 20 and placing cell phone 16 against holder 20 in the manner shown in FIG. 2.

FIG. 3 sets forth a perspective assembly view of magnetic cell phone holder 20. As described above, magnetic cell phone holder 20 includes a cup 21 preferably formed of a magnet material such as iron or steel and defining a rear surface 22, an edge 23 and an interior 24. Holder 20 further includes a double sided adhesive pad 25 which is secured to surface 22 in the manner shown in FIG. 2. Holder 20 further includes a disk-shaped magnet 30 which is received within interior cavity 24 and secured therein using conventional attachment means such as adhesive attachment or the like (not shown). Additionally, magnet 30 may be secured within interior cavity 24 using a forced fit or other mechanical attachment as desired. Also, a plurality of magnets may be combined as magnet 30 and inserted into cavity 24.

Magnet cell phone holder 20 further includes an annular ring 31 defining an aperture 34 therein. Ring 31 is received upon edge 30 of cup 21. It will be noted that aperture 34 is optional in the fabrication of ring 31. Alternatively, ring 31 may be fabricated without aperture 34 and provide a continuous front face in a similar manner to cover 50 shown in FIG. 4. By way of further alternative structure an optional iron or steel plate 35 is shown in FIG. 3 and includes a double-sided attachment pad 36. Plate 35 is optional in that it is utilized solely in circumstances where it is desired to secure or hold an article such as a cell phone at locations thereof which are not sufficiently metallic or magnetic to be attracted to magnet 30. Thus, in such circumstance optional plate 35 is secured at the desired location of the to-be-secured item such as a cell phone. Thereafter, holder 20 is able to provide removable attachment to the object by its attraction to plate 35.

It will be apparent to those skilled in the art, that a number of variations of the present invention magnet cell phone holder may be utilized without departing from the spirit and scope of the present invention. For example, it will be apparent that a variety of shapes may be utilized in forming the present invention magnetic holder. Thus, the circular embodiment shown in FIG. 3 will be understood to be illustrative but by no means limiting in the present invention. Thus for example, in other shapes such as the rectangular shape shown in FIG. 4, as well as other shapes such as triangular or multifaceted may be utilized without departing from the spirit and scope of the present invention. By way of further alternative, it will be understood that the present invention may be utilized in a original equipment fabrication rather than an after market fabrication shown in FIGS. 1 through 3. An example of such original equipment installation is shown in FIG. 5. By way of further alternative and as is illustrated in FIGS. 6, 7 and 8 below, the present invention magnetic cell phone holder may utilize different methods of attachment in different situations as desired. FIG. 6 shows a suction cup alternative to adhesive pad 25 while FIG. 7 shows a clip utilized for example in attachment to the wearers belt or waist and FIG. 8 illustrates an embodiment of the present invention suitable for attachment to the door of a typical vehicle. Thus, it will be apparent to those skilled in the art that the present invention magnetic cell phone holder may be utilized in a variety of environments and situations and may include alternative fabrications without departing from the spirit and scope of the present invention.

In a still further alternate embodiment of the present invention, ring 31 may be omitted and a layer of sealing material 26 may be used to cover the exposed surface of magnet 30 after assembly into cup 21.

FIG. 4 sets forth a perspective assembly view of an alternate embodiment of the present invention magnetic cell phone holder generally referenced by numeral 40. Cell phone holder 40 is substantially identical to cell phone holder 20 described above with the difference being an alternative shape. Accordingly, magnetic holder 40 includes a generally rectangular cup 41 defining a rear surface 43, an interior cavity 44 and a front edge 42. Holder 40 further includes an adhesive pad 45 having double-sided adhesive for attachment of cup 41 to a dashboard or similar environment. Magnetic holder 40 further includes a magnet 46 received and secured within cavity 44 together with a rectangular ring 47 defining an aperture 48 therein. Ring 47 is received upon edge 42 of cup 41 captivating magnet 46 within cavity 44. By way of further alternative, a resilient rubber or plastic cover 50 may be utilized upon cup 41 in place of ring 47. Cover 50 provides an alternative in that aperture 48 is not formed therein. Rather, cover 50 defines a continuous frontal surface 51. Surface 51 may, if desired, support an image such as an advertisement. Thus, cover 50 illustrates an alternative to ring 47 having aperture 48 formed therein.

FIG. 5 sets forth a partial section view of a further alternate embodiment of the present invention magnetic holder generally referenced by numeral 60. The difference between magnetic holder 60 and the above described magnetic cell phone 20 (shown in FIGS. 1 through 3) is the provision of an original equipment or built-in function for magnetic cell phone retention. Also, cell phone holder 60 differs from cell phone holder 20 in that cup 21 is replaced by a plate 70 to simplify the structure. Accordingly, cell phone holder 60 is received within a recess 63 formed in a vehicle dashboard 61. Magnetic cell phone holder 60 is positioned within recess 63 and secured by a two-sided adhesive pad 71 against surface 64 thereof. Magnetic holder 60 includes a plate 70 having a magnet 72 supported therein. Holder 60 further defines an annular ring 73. In the preferred fabrication of the present invention, annular ring 73 extends some what beyond surface 62 of dashboard 61 to provide a full attachment of a conventional cell phone 75. Thus, cell phone 75 which is fabricated entirely in accordance with conventional fabrication techniques includes a cell phone battery 76 which is received against annular ring 73. The extension of annular ring 73 beyond surface 62 of dashboard 61 provides the above described frictional attachment to the force of magnet 72.

FIG. 6 sets forth a partially sectioned side elevation view of a still further alternate embodiment of the present invention magnetic cell phone holder generally referenced by numeral 80. Magnet holder 80 includes a cup 81 supporting an annular ring 83 and in accordance with the above described fabrication shown in FIG. 3 further supporting an internal magnet (not shown). Magnetic holder 80 differs from magnetic holder 20 described above in that the rear surface of cup 81 supports a conventional suction cup 84. Suction cup 84 includes a base 85 secured to rear surface 82 of cup 81 using conventional attachment such as adhesive or the like. The use of suction cup 84 facilities the attachment of magnetic holder 80 to different surfaces without the need to apply an adhesive pad.

FIG. 7 sets forth a partial section view of still further alternate embodiment of the present invention configured to be attachable to a user's waist or belt or other similar clothing or carrying articles. Magnetic holder 90 is substantially identical to magnetic holder 20 described above with the difference being found in the use of an attachment clip 94 in place of adhesive pad 25 (seen in FIG. 3). Thus, magnetic cell phone holder 90 includes a cup 91 having a rear surface 92 and supporting an annular ring 93. A clip 94 includes an attachment 95 which may be secured to surface 92 of cup 91 using conventional attachment such as welding or adhesive or the like. The essential convenience of holder 90 is found in the ability to use clip 94 to secure holder 90 to a clothing article, a purse, a clip board or other articles rather than attachment to a vehicle dashboard or other vehicle surface.

FIG. 8 sets forth a section view of a still further alternate embodiment of the present invention magnetic cell phone holder generally referenced by numeral 100. Magnetic holder 100 is provided to secure a cell phone to a conventional vehicle door 110 by attachment against a vehicle window 111. Thus, magnetic cell phone holder 100 includes a door bracket 105 preferably formed of a molded plastic material or the like, having a plate 107 supporting a tab 108. Plate 107 and tab 108 cooperate to clip or secure magnetic holder 100 upon door 110 against window 111. Door bracket 105 further defines a recess 106 which receives ring 102 and cup 101 of magnetic holder 100. With the exception of bracket 105, magnet holder 100 is fabricated in the manner described above in FIGS. 2 and 3 for magnetic holder 20. Thus, with door bracket 105 supporting magnetic holder 100 and with plate 107 and tab 108 secured to door 110 as shown, the user is able to support a cell phone (not shown) against a selected portion of a vehicle door.

FIG. 9 sets forth a front perspective view point of sale package 120 constructed in accordance with the present invention to facilitate the easy point of sale display of the present invention magnetic cell phone holder. Thus, when package 120 is utilized in combination with the present invention magnet cell phone holder, a convenient point of sale and display apparatus is provided. More specifically, package 120 includes a pair of paper or cardboard sheets 121 and 122. Sheets 121 and 122 define a combined aperture 123 which facilitates hanging package 120 upon a typical store rack (not shown). In the preferred fabrication of the present invention, surface 126 is a clear plastic material and thus magnet holder 20 received within a retainer 125 of package 120 may be seen. The structure of package 120 is set forth and described below in FIG. 10 in greater detail. However, suffice to note here that package 120 receives and supports a magnetic holder fabricated in accordance with the present invention such as magnetic cell phone holder 20 in a convenient packaged combination which may be presented and displayed in a typical point of sale retail facility.

Figure 10:
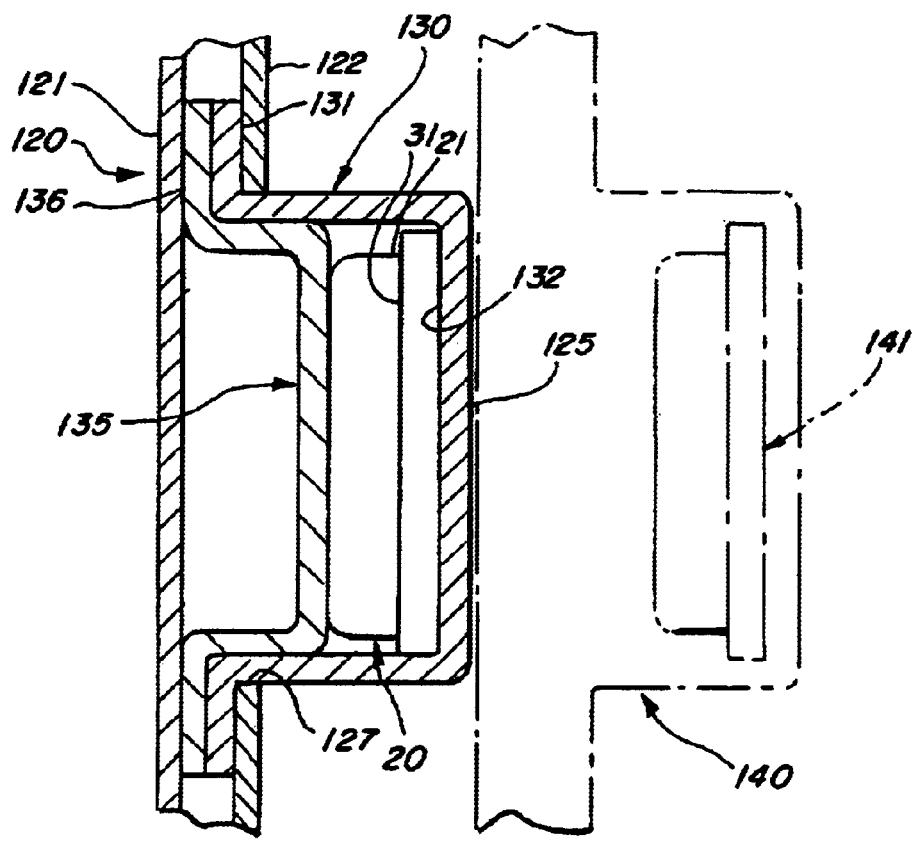
FIG. 10 sets forth a partial section view of the point of sale package taken along section lines 10—10 in FIG. 9 supporting a magnetic holder constructed in accordance with the present invention.

FIG. 10 sets forth a partial section view of package 120 taken along section lines 10—10 in FIG. 9. As described above, package 120 includes a pair of paper or cardboard sheets 121 and 122. Alternatively, sheets 121 and 122 may be fabricated of other suitable materials such as thin plastic sheets or the like. Sheet 122 defines an aperture 127. Package 120 further includes a rear blister 135 preferably formed of a clear or transparent plastic material having a recessed surface 126 and a surrounding flange 136. Package 120 further includes a front blister 130 having a recess 132 and a surrounding flange 131 formed therein. Recess 132 defines a retainer surface 125. In accordance with the preferred fabrication of the present invention, front blister 130 is shaped to be received upon rear blister 135 in the manner shown in FIG. 10. Flanges 131 and 136 are preferably secured between sheets 121 and 122 using conventional attachment such as adhesives or the like.

In accordance with the preferred fabrication of package 120, a magnetic cell phone holder 20 fabricated in accordance with the present invention and having a cup 21 and a ring 31 is received within recess 132 of front blister 130 and captivated therein by surface 126 of rear blister 135.

The importance of the structure of package 120 set forth in FIG. 10 is illustrated by the presence of a phantom line representation of an identical package 140 supporting an identical magnetic holder 141. In accordance with an important advantage of package 120, the spaced positioning of magnetic cell phone holders 20 and 141 resulting from the package structure avoids prohibitive magnetic attraction between the magnets of adjacent magnetic cell phone holders which would other wise arise as a plurality of packages are placed in a typical point of sale display. As can be seen from examining FIG. 10, a substantial space is maintained between magnetic holders 20 and 141 of adjacent packages 120 and 140. In the absence of the novel structure of packages 120 and 140, the strong magnetic attraction between the respective magnetic cell phone holders contained therein would cause packages 120 and 140 to be stuck together with magnetic force rendering them difficult to separate. This mutual magnetic attraction has been found to inconveniently join an array of packages positioned upon a typical point of sale display rendering the separation of a single package to be extremely difficult and cumbersome. In contrast, the use of package structures such as package 120 ensures sufficient placing between adjacent packages to avoid undo magnetic attachment between adjacent magnetic holders. Thus, the present invention magnetic cell phone holder is optimally supported within a package structured in the manner shown for package 120.

In accordance with a further advantage of the inventive combination shown in FIG. 10, the potential purchaser is able to exercise a "try-me" feature provided by magnetic holder 20 and package 120. The potential purchaser may test the holding action of magnetic holder 20 upon a cell phone by placing a cell phone against retainer 125 of rear blister 130.

FIG. 11 sets forth a perspective view of still further alternate embodiment of the present invention cell phone holder generally reference by numeral 150. Cell phone holder 150 includes a riser 151 having a generally cylindrical shape and defining a lower end portion 153 and an angled surface 152. Surface 152 supports a magnetic holder 154 fabricated in the manner above and having a metal cup 157 within which a magnet (not shown) is supported. A seal layer 158 is placed upon the enclosed magnet of magnet holder 154 and provides sealing closure of the open side of cup 157. An image 159 such as a vehicle logo or other advertising item is formed upon seal layer 158. Cup 157 is secured to surface 152 by a conventional adhesive attachment such as the above described two-side adhesive pad (not shown). In the anticipated use of cell phone holder 150 a vehicle console 155 is shown having a conventional beverage cup receptacle 156 formed therein. In accordance with the preferred utilization of cell phone holder 150, riser 151 is supported within cup receptacle 156 by the insertion of lower end portion 153 therein. Thereafter, a conventional cell phone 15 may be supported upon magnetic holder 154 by magnetic attraction and frictional force as described above and is conveniently retained within the vehicle interior. In further accordance with an advantage cell phone holder 150, riser 151 and magnet holder 154 may be alternatively positioned within different cup receptacles or within different portions of the vehicle interior as desired.

FIG. 12 sets forth a side elevation view of a still further alternate embodiment of the present invention cell phone holder generally referenced by numeral 160. Cell phone holder 160 is intended to cooperate with a conventional vehicle grille 163 shown in section view which may for example comprise a ventilation or air conditioning vent in a typical vehicle. Cell phone holder 160 includes a magnet support 161 having an extending spring clip 162 supported thereon. A magnet holder 20 fabricated in the manner described above and having a cup 21 and a friction ring 31 is joined to magnet support 161 utilizing conventional attachment such as the above described adhesive attachment. In the intended utilization of cell phone holder 160, clip 162 is positioned within grille 163 by inserting clip 162 therein. The spring character within clip 162 secures clip 162 which in turn supports cell phone holder 160 upon grille 163.

In accordance with the anticipated use of magnetic cell phone holder 160, the support of magnetic holder 20 by clip 162 and magnet support 161 allows a conventional cell phone 15 to be placed upon magnetic holder 20 for support as described above.

FIG. 13 sets forth a side elevation view of a still further alternate embodiment of the present invention cell phone holder generally referenced by numeral 170. Cell phone holder 170 is configured to be supported within a conventional cigarette lighter receptacle 178 in a plug-in attachment. In accordance with conventional fabrication techniques, cigarette lighter receptacle lighter 178 includes a plurality of electrical contacts 176, 177 and is configured to receive a conventional cigarette lighter. In accordance with the embodiment of the present invention shown in FIG. 13, a magnet support 171 is secured to a magnetic holder 20 having a cup 21 and a friction ring 31 fabricated in the manner described above. Cup 21 is secured to magnet support 171 by conventional attachment such as the above described pads. Magnet support 171 further includes a plug 172 sized and shaped to be receivable within cigarette lighter receptacle 178. In essence, plug 172 may be fabricated in accordance with conventional fabrication techniques and thus includes a plurality of electrical contacts 174, 173 and 175 which provide electrical connection to contacts 177 and 176 within receptacle 178. In further accordance with the present invention, a power cord 179 having one end electrically connected to contacts 173 and 174 by conventional connecting wires (not shown) extends from plug 172 and supports a coupling element 180. Coupling element 180 is configured to be received with the power/charger receptacle of a conventional cell phone 15. Thus, in the anticipated use of cell phone holder 170, plug 172 is received and mechanically supported within receptacle 178 while providing electrical power connection to the electrical contacts within receptacle 178. Cord 179 is plug into a cell phone 15 supported upon magnetic holder 20 to provide power for operation and charging. As a result, cell phone holder 170 provides both mechanical support and operative and charging power for a cell phone supported thereon.

FIG. 14 sets forth an alternate embodiment of the point of purchasing packaging utilized in combination with the present invention magnet holder for cell phones and the like which is generally referenced by numeral 190. Package 190 is formed of a front layer 191 and a rear layer 200 (seen in FIG. 15) joined by a hinge 196 to form a "clam shell" type package. Front layer 191 is preferably formed of a clear transparent plastic material or the like and defines and aperture 192 together with a U-shaped bumper 194 and an inverted U-shaped attachment rib 195. Front layer 191 further defines a cavity 193 configured to receive and captive a magnetic holder 20 fabricated in the manner described above. In accordance with an important advantage of package 190, the user is able to place a cell phone 15 against the outer surface of cavity 193 for attachment thereto by the magnetic attracting force of magnetic holder 20. This in essence provides a "try-me" feature for package 190 allowing the consumer to fit a cell phone 15 within U-shaped bumper 194. By way of further advantage, U-shaped bumper 194 while facilitating the above described "try-me" feature provides the spacing configuration characteristic of package 120 shown in FIG. 10 thereby avoiding undesired attachment of package 190 to an adjacent package at the point of purchase display. Attachment rib 195 is fabricated to provide secure attachment between front layer 191 and rear layer 200 (seen in FIG. 15). To add further color and attraction to package 190, a generally planar insert 197 is received between front layer 191 and rear layer 200 in the manner shown in FIG. 15.

FIG. 15 sets forth a section view of package 190 taken along section lines 15—15 in FIG. 14. As described above, front layer 191 defines an aperture 192, a U-shaped bumper 194 and an attachment rib 195. As is also described above, front layer 191 defines a cavity 193 which receives and supports a magnetic holder 20. A rear layer 200 is joined to front layer 191 by a hinge 196 to provide the above mentioned clam shell type package. Rear layer 200 is substantially planar with the exception of an attachment rib 201 conformed generally in accordance with attachment rib 195 of front layer 191. Attachment rib 201 is shaped and sized with respect to rib 195 to provide a force-fit secure attachment therebetween to provide closure of package 190. A planar insert 197 is captivated between front layer 191 and rear layer 200 of package 190. In the preferred fabrication of package 190, insert 197 defines an aperture 198 corresponding to the shape of magnetic holder 20. However, it will be apparent that insert 197 may, if desired, fabricated without aperture 198. In order to provide a point of purchase hanging display feature, front layer 191 defines an aperture 192 while insert 197 defines a corresponding aperture 202 and a rear layer 200 defines a similarly corresponding aperture 203. The resulting combination of apertures facilitates the hanging of package 190 upon a conventional type of point of purchase display facility.

In accordance with the above described try-me feature of package 190, it will be noted that the user is able to place a conventional cell phone 15 within U-shaped bumper 194 so-as-to test the magnetic attraction of magnetic holder 20. Thus, package 190 provides an alternative to package 120 shown in FIG. 10 while maintaining against undesired attraction between packages upon the hanging display and while maintaining try-me feature thereof.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A magnetic cell phone holder constructed for use in combination with a cell phone, said magnetic cell phone holder comprising:

a cup formed of a metal material and having a rear surface, an interior cavity and an open edge facing said cell phone;

a magnet having one side facing said cell phone received within said interior cavity producing magnetic flux;

a non-magnetic friction element received upon said open edge and supported by said cup; and attachment means joined to said cup for securing said cup upon a selected surface, said magnet, said cup and said friction element cooperating to hold a cell phone by a combination of magnetic attraction and friction, said cup enclosing said magnet on all sides except said one side facing said cell phone operative to concentrate said magnetic flux about said open edge.

2. The magnetic cell phone holder set forth in claim 1 wherein said friction element includes a ring formed of a high friction material and defining an aperture therein.

3. The magnetic cell phone holder set forth in claim 2 wherein said attachment means includes an adhesive pad secured to said rear surface of said cup.

4. The magnetic cell phone holder set forth in claim 3 wherein said friction means includes a cap formed of a resilient material enclosing said edge of said cup.

5. The magnetic cell phone holder set forth in claim 4 wherein said cap defines an aperture.

6. The magnetic cell phone holder set forth in claim 5 wherein said cup, said magnet and said cap define generally circular shapes.

7. The magnetic cell phone holder set forth in claim 5 wherein said cup, said magnet and said cap define generally rectangular shapes.

8. The magnetic cell phone holder set forth in claim 1 wherein said attachment means includes a suction cup having a base attached to said rear surface of said cup.

9. The magnetic cell phone holder set forth in claim 1 wherein said attachment means includes a spring clip attached to said rear surface of said cup.

10. The magnetic cell phone holder set forth in claim 1 wherein said attachment means includes:

a door bracket having a recess formed therein for receiving said cup, said adhesive pad, said magnet and at least a portion of said friction element;

a plate extending horizontally from said bracket; and a downwardly extending tab, said plate and said tab cooperating to secure said door bracket to a vehicle door.

11. The magnetic cell phone holder set forth in claim 1 in combination with a package, said package including:

a generally planar member having a hanging aperture and blister aperture;

a front blister secured to said planar member having a front blister recess receiving said magnetic cell phone holder;

a rear blister secured to said planar member having a rear blister recess extending into said front blister recess to captivate said magnetic cell phone holder within said front blister recess.

12. The magnetic cell phone holder and package set forth in claim 11 wherein said generally planar member includes a pair of planar sheet layers each defining a hanging aperture and a blister aperture and wherein said front blister and said rear blister each define extending flanges secured between said planar sheet layers.

13. A magnetic cell phone holder constructed for use within a vehicle interior having a vehicle surface and in combination with a cell phone, said magnetic cell phone holder comprising:

a cup formed of ferromagnetic material and having a rear surface, an interior cavity and an open edge facing said cell phone;

a magnet received within said interior cavity producing magnetic flux;

a layer of sealing material received upon magnet within said cup; and attachment means joined to said cup for securing said cup upon a vehicle surface, said magnet, said cup and said sealing material cooperating to hold a cell phone by a combination of magnetic attraction and friction, and said cup providing a confining and directing effect upon said magnetic flux to concentrate said magnetic flux generally along said open edge to increase the attractive force upon said cell phone.

14. The magnetic cell phone holder set forth in claim 13 wherein said vehicle surface defines a recess for receiving and supporting said cup, said magnet, said attachment means and said sealing material.

15. The magnetic cell phone holder set forth in claim 14 wherein said vehicle surface includes a portion of a vehicle dashboard.

16. The magnetic cell phone holder set forth in claim 13 further including a ferromagnetic plate and means for attaching said ferromagnetic plate to a cell phone.

17. The magnetic cell phone holder set forth in claim 1 further including a ferromagnetic plate and means for attaching said ferromagnetic plate to a cell phone.

* * * * *